United States Patent [19]
Uchida

[11] Patent Number: 5,754,528
[45] Date of Patent: May 19, 1998

[54] VIRTUAL RING CONFIGURATION METHOD AND VIRTUAL RING SYSTEM

[75] Inventor: Tetsuya Uchida, Kawasaki, Japan

[73] Assignee: Fujitsu Limited, Kanagawa, Japan

[21] Appl. No.: 654,778

[22] Filed: May 29, 1996

Related U.S. Application Data

[63] Continuation of Ser. No. 405,541, Mar. 16, 1995, abandoned.

[30] Foreign Application Priority Data

Mar. 18, 1994 [JP] Japan ..................................... 6-049497

[51] Int. Cl.$^6$ ................................................... H04L 12/43
[52] U.S. Cl. ........................... 370/222; 370/228; 340/827
[58] Field of Search .......................... 370/16, 16.1, 85.12, 370/85.13, 85.14, 85.15, 222, 223, 225, 227, 228; 340/825.01, 825.05, 827; 359/119; 395/181, 182.02

[56] References Cited

U.S. PATENT DOCUMENTS

| | | | |
|---|---|---|---|
| 5,187,706 | 2/1993 | Frankel et al. | 370/16.1 |
| 5,278,824 | 1/1994 | Kremer | 370/16.1 |
| 5,315,582 | 5/1994 | Morizono et al. | 370/16.1 |
| 5,327,427 | 7/1994 | Sandesara | 370/16.1 |
| 5,394,389 | 2/1995 | Kremer | 370/16.1 |
| 5,406,549 | 4/1995 | Kremer | 370/16.1 |
| 5,446,725 | 8/1995 | Ishiwatari | 370/16.1 |

*Primary Examiner*—Hassan Kizou
*Attorney, Agent, or Firm*—Helfgott & Karas, P.C.

[57] ABSTRACT

In a virtual ring configuration method and a virtual ring system, a plurality of nodes are set on a plurality of rings and the rings are cross-connected. Each node has a transmitting unit and a receiving unit for sending and receiving service information between the nodes by the SONET path. A judging unit is provided for judging whether or not there is an input of obstruction information by the SONET path. A path protection switch is provided at a receive terminal, which switches the receive terminal which receives the SONET path in cases where the judging unit judges that obstruction information has been received.

12 Claims, 10 Drawing Sheets

VIRTUAL RING CONFIGURATION METHOD AND VIRTUAL RING SYSTEM

This is a continuation of application Ser. No. 08/405,541, filed Mar. 16, 1995, now abandoned.

BACKGROUND OF THE INVENTION

The present invention relates to a virtual ring configuration method and a virtual ring system and more particularly, relates to a virtual ring configuration method and a virtual ring system for a ring configuration having an optical transmitting configuration with an optical transmission apparatus which transmits and receives SONET (Synchronous Optical Network) signals, and which performs ring configurations which enable recovery in cases when an obstruction has occurred in an optical transmission path.

In recent years, optical transmission networks have been required to connect between rings as network configurations have become more complicated. When an obstruction such as one which cuts an optical fiber cable occurs, it is preferable for an optical communications network to have a ring configuration so that communications are not disrupted.

Figure 1:
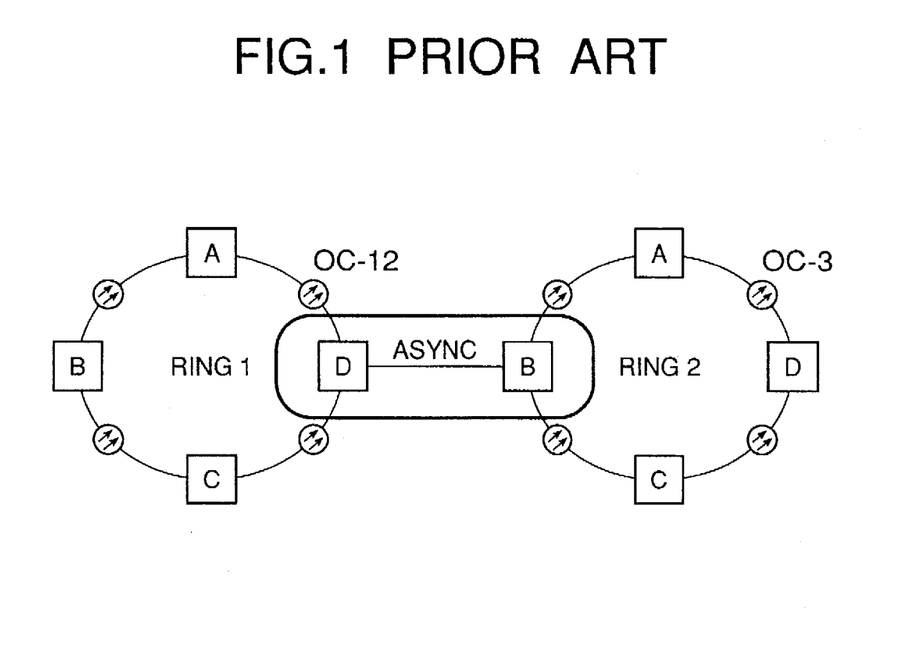
FIG. 1 shows an example of a conventional network configured from two rings.
Figure 2:
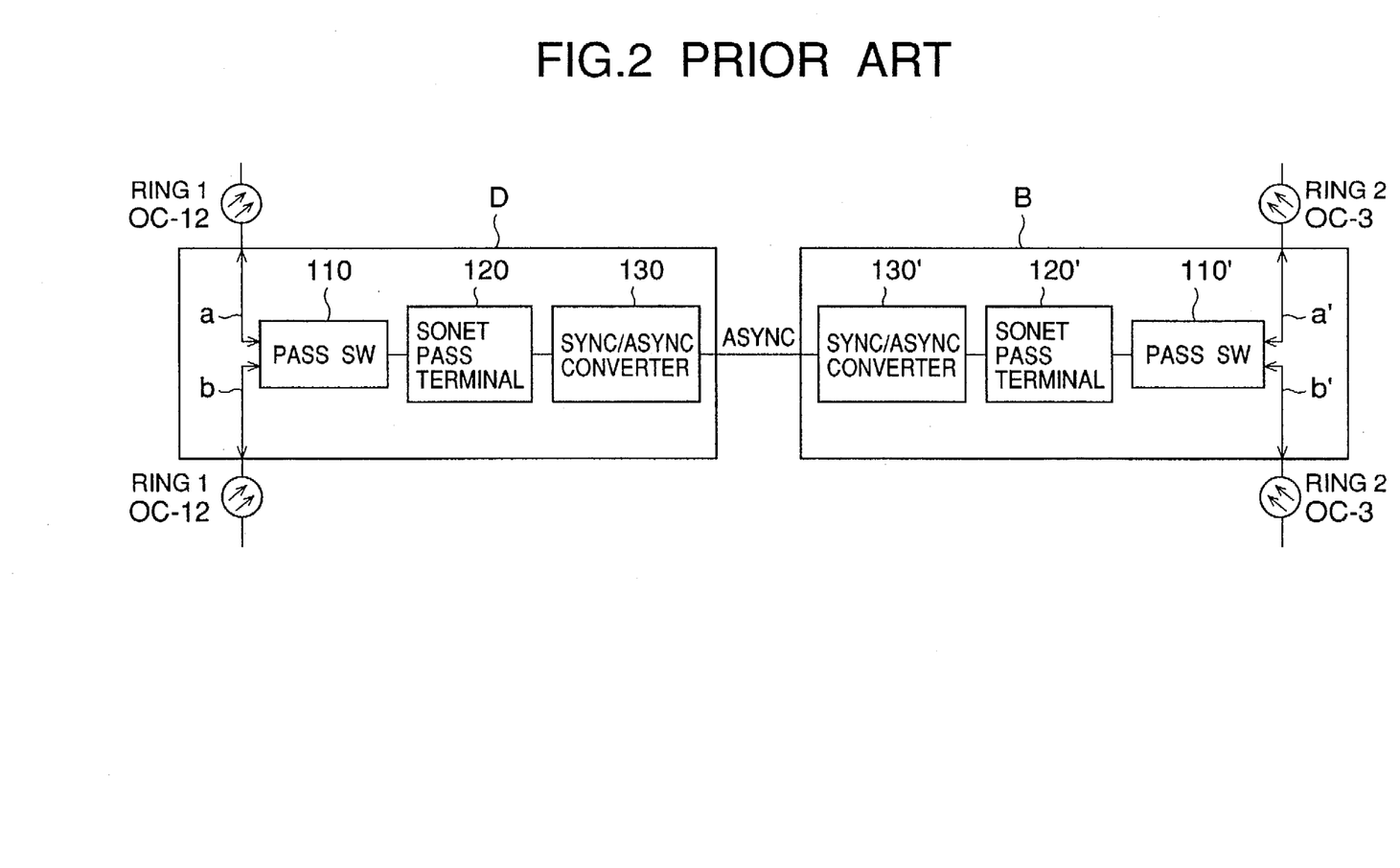
FIG. 2 shows two nodes of the configuration in FIG. 1.

A description will be given for a configuration of a network using a conventional multiple ring configuration. FIG. 1 shows an example of a conventional optical communications network (hereinafter simply termed a "network"). The network shown in the figure is for a case in which a ring 1 and a ring 2 are connected by an asynchronous circuit within the same station. The configuration shown in FIG. 2 is for a node D of the ring 1 and a node B of the ring 2 shown in FIG. 1. In FIG. 2, both the node D and the node B have the same configuration. The node D and the node B each comprise a path switch 110, a SONET path terminal 120 and a synchronous/asynchronous converter 130.

The path switch 110 of the node D selects either of a signals "a" and "b" of SONET signals input from the line side, and inputs the selected signal to the SONET path terminal 120. The SONET path terminal 120 converts the SONET signal selected by the path switch 110 into an asynchronous signal and therefore terminates the SONET path layer. The SONET signal which has been terminated by the SONET path terminal is input to the synchronous/asynchronous converter 130 and converted into asynchronous signals. The asynchronous signals is input to the node B of the ring 2 at the same station. The asynchronous signals input to a synchronous/asynchronous converter 130' of the node B is converted into a synchronous signal which is then input to the SONET path terminals 120'. The SONET path terminal 120' uses a method the reverse of that of the SONET path terminals 120 on the side of the node D to generate a SONET signal and this is transferred to both line sides "a'" and "b'" by the path switch 110'.

The description above is for the case when there is transfer from the ring 1 to the ring 2 but the same procedures when there is signal transfer from the ring 2 to the ring 1.

However, when a network is to be configured using a multiple ring configuration as in the conventional method described above, the configuration is such that each ring is independent and this requires that contacts be provided somewhere on each ring and that a plural number of rings be connected. With the conventional method described above, when there is the connection of the ring 1 and the ring 2, the node D on the side of the ring 1 and the node B on the side of the ring 2 are points of contact and connect the two rings.

In addition, as can be seen from FIG. 1, the node D is the only point of connection for ring 1 and so there is the problem that there can be no recovery for the service should the node be down due to a missing input signal, a break in an optical fiber cable or some other cause such as a bit error.

In addition, when there is an asynchronous circuit between a node and another node, the transmission speed of a SONET signal is set slightly faster than for an asynchronous signals and so there is termination of the SONET signal when a SONET overhead signal is inserted into a surplus portion of SONET frame format after an asynchronous signal has been inserted in SONET frame format, with the result that the switch trigger (path AIS, UNEQ code and the like) cannot be transferred to the other nodes. Accordingly, it is not possible to transfer SONET overhead signals when there is an asynchronous circuit between SONET networks. In addition, when there is an asynchronous circuit between SONET networks, it is not possible to receive and pass SONET overhead signals within that network, resulting in the problem that it is not possible to rescue a circuit by a path switch in the conventional system such as described above.

SUMMARY OF THE INVENTION

Accordingly, a general object of the present invention is to provide a novel virtual ring configuration method and a virtual ring configuration system which solve the problems associated with the conventional art and which enable management of a plural number of rings as a single network.

A more specific object of the present invention is to provide a virtual ring configuration method and a virtual ring configuration system which enable the number of rings to be easily increased.

Another object of the present invention is to provide a virtual ring configuration method and a virtual ring configuration system which enable a performance of a switching operation without recognition of a route which is taken by a received signal in cases when an obstruction has occurred in the ring, thereby preventing interruption to service when there is an obstacle.

Still another object of the present invention is to provide a virtual ring configuration method and a virtual ring configuration system which are not influenced when an synchronous circuit is inserted into the network.

Still another specific object of the present invention is to provide a virtual ring configuration method and a virtual ring configuration system which enable flexibility in cross-connection settings within the apparatus.

Still another specific object of the present invention is to provide a virtual ring configuration method and a virtual ring configuration system which enable a separate ring to be configured from network elements along the ring.

Accordingly, a general object of the present invention as described above, is attained by the use of a virtual ring configuration method and a virtual ring configuration system which cross-connect a plural number of rings which send and receive service information by a SONET path, in all of the nodes of two optical communications network.

Furthermore, the objects described above are attained by a virtual ring configuration method and a virtual ring configuration system which have a plural number of nodes on a ring, and which when there is transmitting and receiving of service information between nodes by the SONET path, a function for receiving the SONET path between nodes via the ring, a function for judging whether or not there is an input of obstruction information by the SONET path, and a receive terminal of a path protection switch which receives signals inside a node, which signals are input when obstruction information has been input, perform normal operation and switch to at least one ring.

Furthermore, the objects described above can be attained by a virtual ring configuration method and a virtual ring configuration system which, when there is the judgment for whether or not obstruction information has been input, and when a path alarm indication signal is included in the SONET path received from a node of a previous stage, judge that an obstruction has occurred in the node of the previous stage.

In addition, the objects described above can be attained by a virtual ring configuration method and a virtual ring configuration system wherein judgment for whether or not obstruction information has been input, and switching of a receive terminal of a path protection switch are performed by a tributary side within a node.

In addition, the objects described above can be attained by a virtual ring configuration method and a virtual ring configuration system provided with an interface on the tributary side within a node which is the same as that on the line side, with signals input from the line side being processed by the tributary side and transmitted to other nodes.

In addition, the objects described above can be attained by a virtual ring configuration method and a virtual ring configuration system which, when the tributary side is processing signals input from the line side and a ring between this node and a node which next transfers the data is asynchronous, convert a path alarm indication signal input from the line side into an asynchronous signal.

In addition, the object described above can be attained by a virtual ring configuration method and a virtual ring configuration system which, when a plural number of nodes in a ring are cross-connected, have an arbitrary setting for which ring receive terminal switching is to be performed by a path protection switch.

In this manner, the present invention passes a switch trigger to another ring by the using of path AIS as the trigger for the path protection switch. In addition, by having flexibility in the cross-connection settings which configure the nodes of multiple rings, there is setting for whether or not path protection switching is performed, and the number of circuits is increased.

Furthermore, the present invention has the same interface on the tributary side and the line side of each node to therefore enable configuration of a separate ring from the nodes around the ring.

In addition, the present invention can perform path protection switching by the conversion and transmission of a path alarm indication signal into an asynchronous signal in cases when a circuit between a self-node and a next node to which information is to be transmitted is asynchronous.

Other objects and further features of the present invention will be apparent from the following detailed description when read in conjunction with the accompanying drawings.

DESCRIPTION OF THE EMBODIMENTS

The following is a detailed description of an embodiment of the present invention, with reference to the appended drawings.

Figure 3:
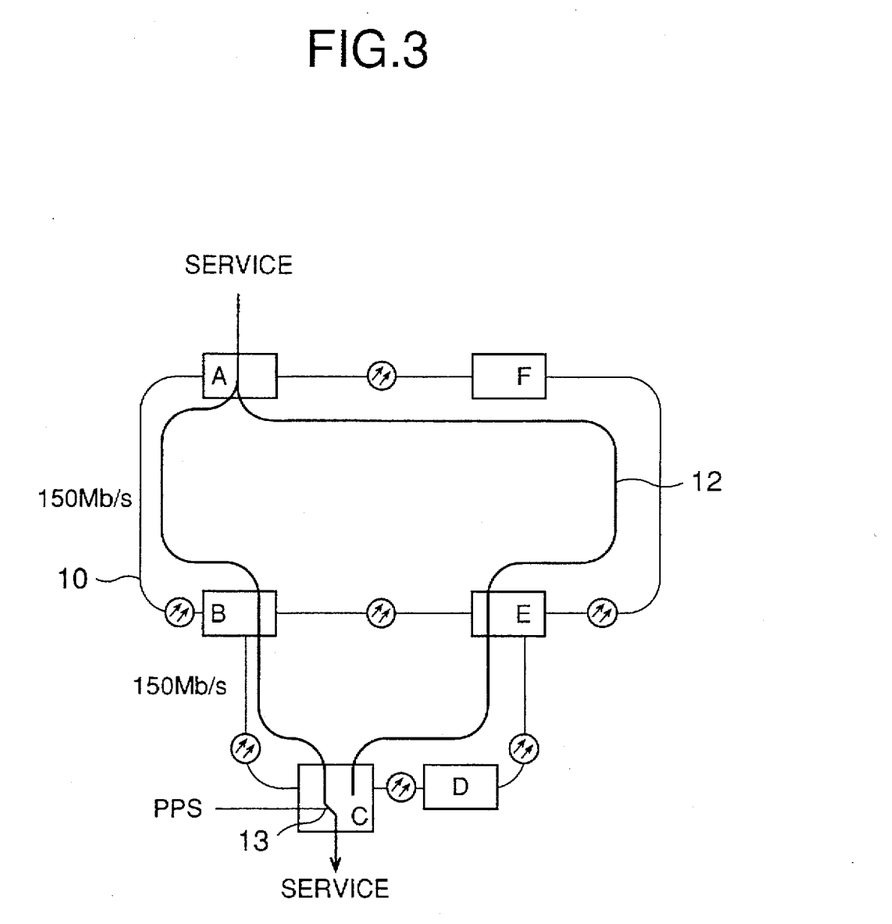
FIG. 3 is a view showing a ring configuration of an embodiment according to the present invention.

FIG. 3 shows a ring system of an embodiment according to the present invention. The ring system shown in the figure is configured from nodes A, B, C, D, E and F having a path protection switch (hereinafter termed a PPS) 13, a ring 12, and a transfer path 10. The transfer path 10 is connected to each node. FIG. 3 shows only the node C as having a path protection switch (PPS) 13, but all of the nodes in the figure have them.

Each of the nodes shown in FIG. 3 have a SONET path passing through them with a PATH-AIS (hereinafter a P-AIS) switching as the switching trigger, and passing the switching trigger to other rings. For example, the PPS of the node C switches when the P-AIS is received as obstruction notification information. The PPS 13 performs switching with the path alarm indication signal (P-AIS) as the switching trigger.

Moreover, in this example, a 150-Mb/s optical interface is used as the interface. The P-AIS mentioned above is an alarm indication signal which is loaded on the transfer signal when an abnormality has occurred on the line side. Abnormalities which occur on the line side include missing input signals to the line side receive apparatus, disconnection of the optical fiber, bit errors and the like.

The following is a description of the operation in each node when there is receipt of the P-AIS which is the obstruction notification information. In the example shown in FIG. 3, the service information which is input from the node A is passed to the node C via the node B and is then passed to the node C via the node F, the node E and the node D.

Figure 4:
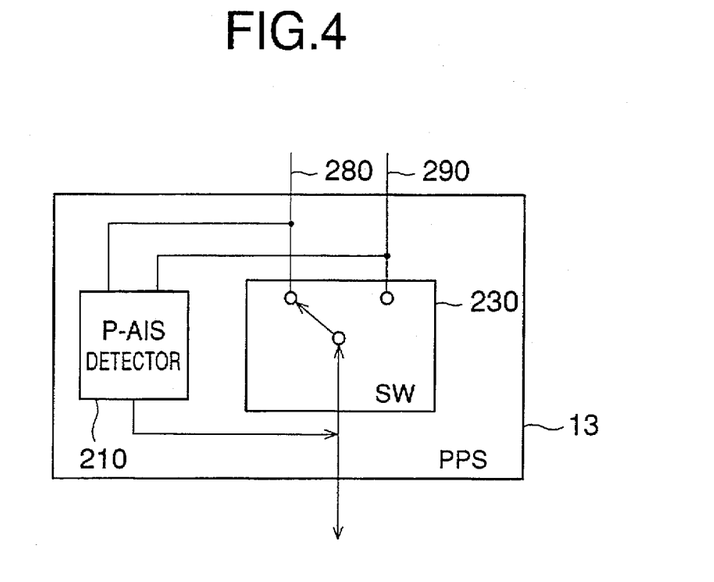
FIG. 4 is a view showing a configuration of a path protection switch of an embodiment according to the present invention.

FIG. 4 is a block diagram showing a configuration of a PPS of each node in an embodiment according to the present invention. Transfer paths 280, 290 are connected to a switch portion 230 and are also connected to P-AIS detection portion 210. The P-AIS detection portion 210 monitors the transfer signals input via the transfer paths 280, 290, detects the P-AIS which is sent by the transfer path when an abnormality has occurred on the line side, and sends the P-AIS to the switch portion 230.

When it is assumed that the node shown in FIG. 4 is the node C of the example shown in FIG. 3 above, the ring which passes through the node B is made the transfer path 280 while the ring which passes through the node D is made the transfer path 290. Here, the switch portion 230 of the PPS 13 switches to the side of the transfer path 280. When this occurs and there is the input of the P-AIS from the side of the transfer path 280, the P-AIS detection portion 210 detects the P-AIS. The switch portion 230 which has switched to the side of the transfer path 280 is then switched to the side of the transfer path 290.

Figure 5:
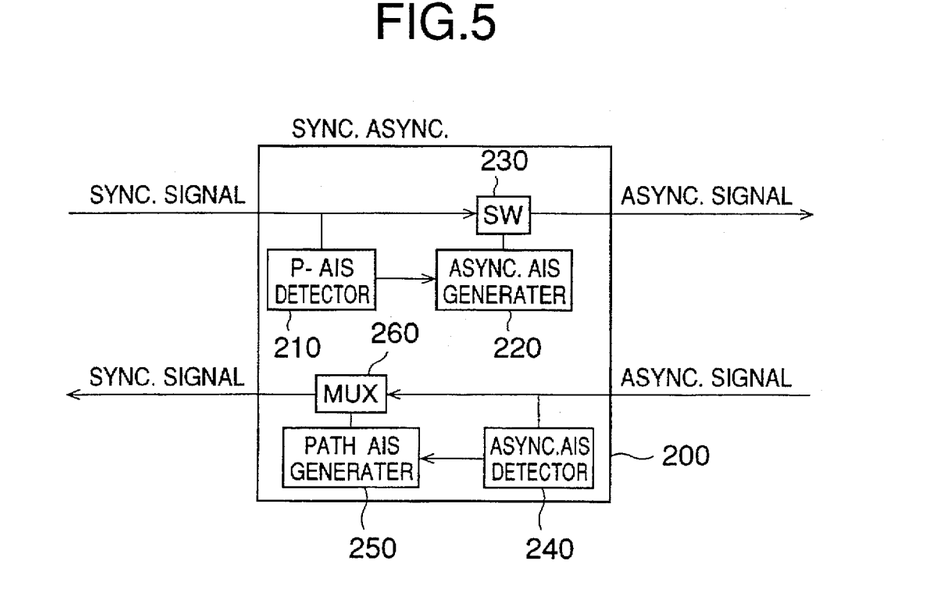
FIG. 5 is a view showing a configuration of a synchronous conversion portion of an embodiment according to the present invention.

Then, when each of the nodes is in an asynchronous ring between networks, the nodes have a function to receive both of the synchronous signals and the asynchronous signals and to convert them. That is to say, as shown in FIG. 5, in addition to the P-AIS detection portion 210 and the switch portion 230 shown in FIG. 4, each node has an asynchronous-AIS generator 220, an asynchronous-AIS detection portion 240, a P-AIS generator 250 and a multiplex apparatus 260. The configuration shown in FIG. 5 is called a synchronous/asynchronous converter 200.

When there is an input of a synchronous signal from another node, and there is a P-AIS signal included in that synchronous signal, the P-AIS detection portion 210 of the synchronous/asynchronous converter 200 outputs a P-AIS detection signal to the asynchronous-AIS generator 220. The asynchronous-AIS generator 220 converts the synchronous signal into an asynchronous signal and inputs the converted asynchronous-AIS to the switch portion 230. With this, the asynchronous P-AIS signal is transferred to another node via the switch portion 230.

In addition, when an asynchronous signal is input from an external node and there is a P-AIS signal included in that asynchronous signal, the asynchronous-AIS detection portion 240 of the synchronous/asynchronous converter 200 inputs that signal to the P-AIS generator 250. The P-AIS generator 250 generates the P-AIS and inputs the P-AIS to the multiplex apparatus 260. The multiplex apparatus 260 multiplexes the P-AIS and the asynchronous signal input from the external node and outputs it as a synchronous P-AIS.

Figure 6:
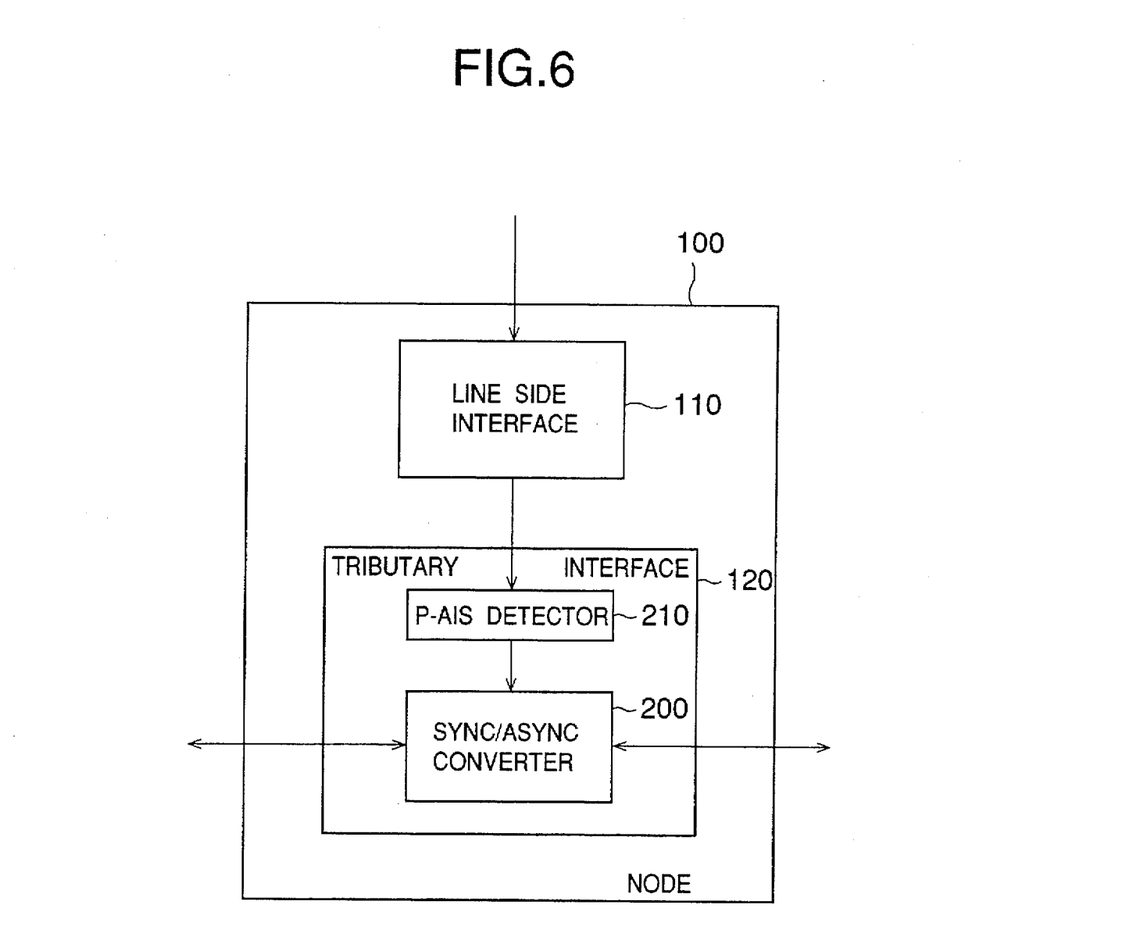
FIG. 6 is a view showing a configuration of a node of an embodiment according to the present invention.

FIG. 6 shows a configuration of a node of an embodiment according to the present invention. As shown in FIG. 6, inside the node there is a line-side interface 110 and a tributary-side interface 120. The synchronous/asynchronous converter 200 is provided in the tributary-side interface 120 of each node. The following description is for when a synchronous signal or an asynchronous signal is input from the line-side interface 110 to the tributary-side interface 120 of the node.

When there is a receipt of the P-AIS for a synchronous signal in the line-side interface 110 of node on the side of the synchronous receive signal, and there is an asynchronous circuit between this and the node of the transmission destination, the synchronous/asynchronous converter 200 of that node converts that synchronous signal to an asynchronous signal and transmits it.

When there is a receipt of the P-AIS for a synchronous signal in the line-side interface 110 of the node on the side of the asynchronous receive signal, and there is a synchronous circuit between this and the node of the transmission destination, the synchronous/asynchronous converter 200 of that node converts the asynchronous signal to the synchronous signal and transmits it.

When there is a receipt of the P-AIS for an asynchronous signal in the line-side interface 110 of the node on the side of the asynchronous receive signal, and there is a synchronous circuit between this node and the node of the transmission destination, the synchronous/asynchronous conversion portion 200 of that node sends that asynchronous signal on as it is.

Accordingly, at both the synchronous side and the asynchronous side of the node, it is possible for the node to send and receive the P-AIS the switching trigger for the PPS ring, and the node is also possible to receive the P-AIS the cases when an asynchronous circuit intervenes between rings. In this case, if the P-AIS passes the SONET path, then each of the nodes allows passage to other nodes as monitoring the P-AIS enables the switching operation to be performed irrespective of which route the received signal passed.

Furthermore, which this configurations it is still possible to configure the virtual ring even if there is an asynchronous circuit between nodes on the ring. Accordingly, any interruption to service is prevented.

Figure 7:
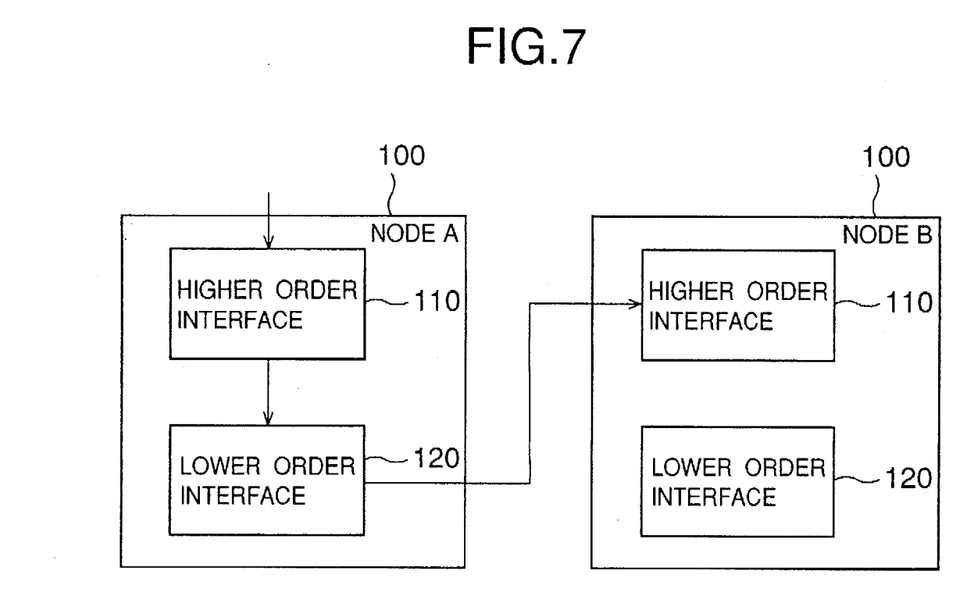
FIG. 7 is a view showing an example of the same interface for the interface of tributary side and the interface for a line-side within a node in an embodiment according to the present invention.

Moreover, as shown in FIG. 7, by having the same interface on both the tributary-side and the line-side, the SONET path terminal 120 of the network element of a node A can connect directly to the line-side interface 110 of separate node B, thereby reducing the number of a network elements of contact points between rings. As a result of this, there is no termination of the SONET path signals between rings. More specifically, with an FLM 150 ADM, there can be the same OC-3 (150 Mb/s optical) interface for both the line-side and the tributary-side. Signals after cross-connection by VT or SAT1, are multiplexed up to STS-3 (Synchronous Transport Signal, Level 3) and sent to OC-3. In this case, the OC-3 signal of the tributary-side interface are not necessarily all used but the speed of the line layer has no relationship to the PPS. This PPS ring is configured by several path layer signals gathered together.

Figure 8:
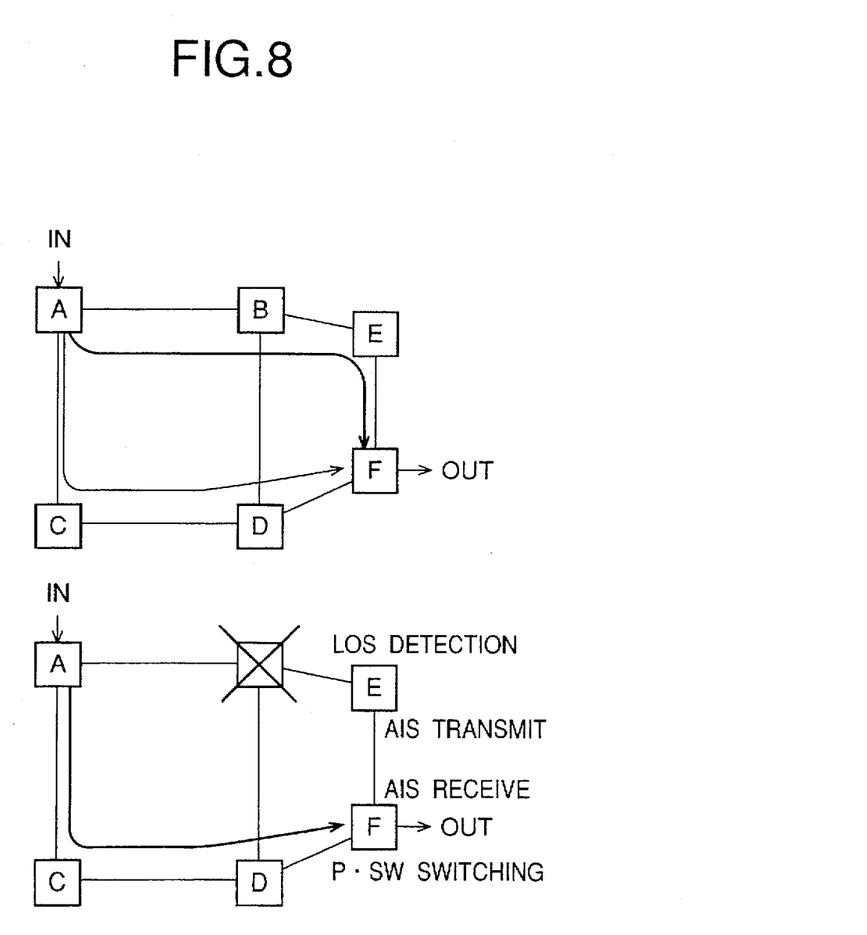
FIG. 8 is a view describing a recovery method of a signal transfer in an embodiment according to the present invention.

Next, as a specific example, is an explanation for recovery in a case when there is a down of a circuit caused by power failure or the like. FIG. 8 is a diagram for describing recovery in an embodiment according to the present invention.

As shown in FIG. 8, paths are the two paths of A-B-E-F and A-C-D-F when there is a transfer of signals between nodes A-F. In FIG. 8 was originally the transfer using path A-B-E-F, but then some cause has led to a power failure at the node B. Thus, the optical signal transferred from the node B was interrupted.

The node E detects the signal interrupt at the node B by the P-AIS which is transmitted from the node B. At this time, the P-AIS passes through the SONET path and so the node E can monitor which route has been passed. When the node E detects the optical signal interrupt from the received signals, the STS1 (Synchronous Transport Signal Level-1) /VT1.5 path which is included in that line is converted to AIS (in actual fact, a path overhead bit indicating AIS is flagged) and there is transfer to the next node F.

After this, when the PPS 13 for the node F detects the P-AIS from the signal transferred from the node E, there is switching so that signals are received via the node C and the node D to which normal signals are input. Accordingly, the node F switches the PPS 13 to the system to which said normal signals are input (that is, a system to which a P-AIS is not input). This occurs in cases when some abnormality has been generated in a node of a system, and also in cases when a normal signal is input from another system. By this action, the ring system enables communications between all nodes even if an obstruction has been generated in a node at any one place.

Figure 9:
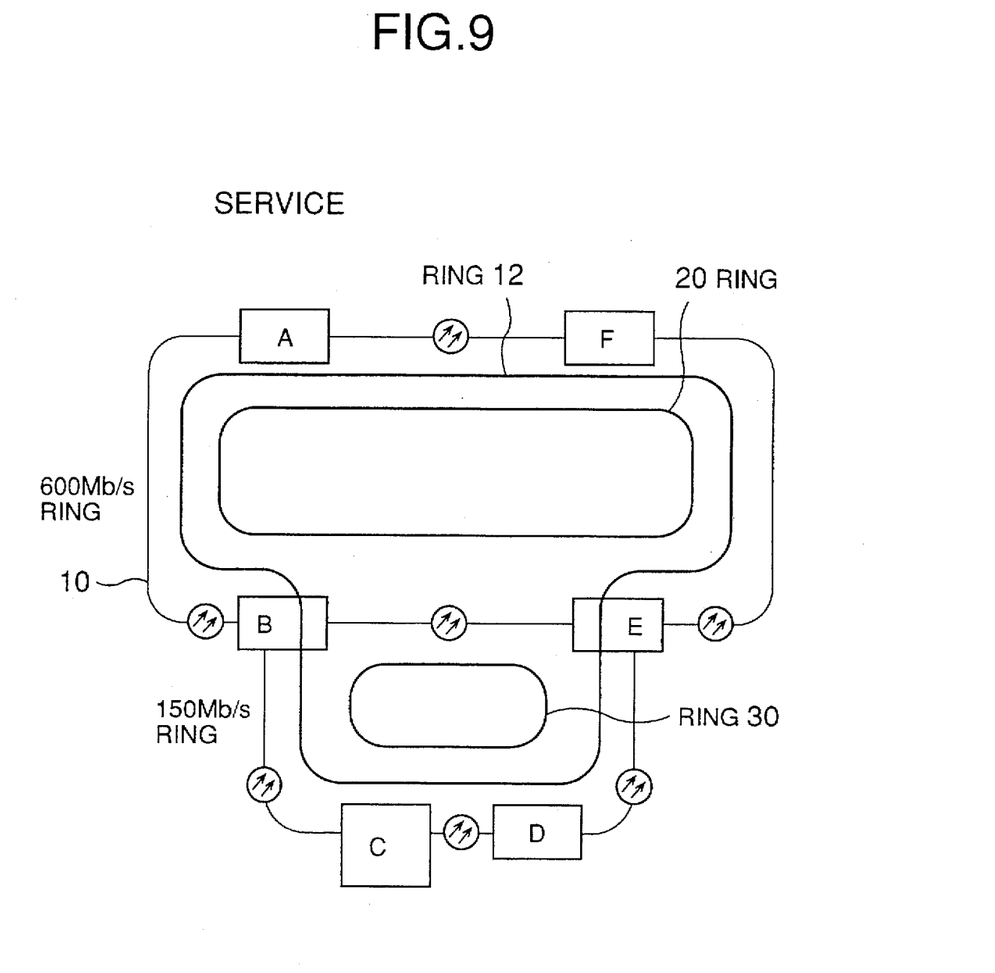
FIG. 9 is a view showing a multiple ring configuration of an embodiment according to the present invention.

The following is a description with reference to FIG. 9, of a ring configuration for a case when there is only ADD/

DROP from one direction of the line-side for the cross-connect settings internal to the apparatus.

In FIG. 9, in addition to the ring 12 shown in FIG. 3, there is a virtual configuration for rings 20, 30. The ring 12 passes through the node "a", "b", "c", "d", "e" and "f". The ring 20 passes through the node "a", the node "b", the node "e" and the node "f". The ring 30 passes through the node "b", "c", "d" and "e".

Figure 10:
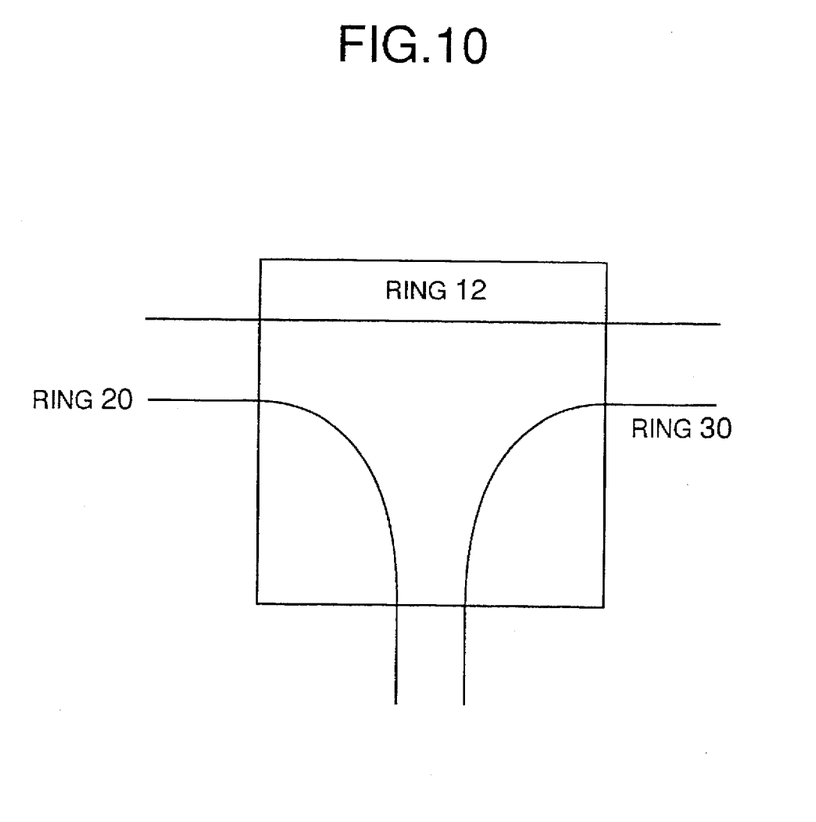
FIG. 10 is a view showing cross-connection at a station "B" of an embodiment according to the present invention.

At this time, the cross-connection in the node "b" is as shown in FIG. 10. The cross-connection in the node "b" has cross-connection between the ring 12, the ring 20 and the ring 30, and the line-side time slots of the ring 20 and the ring 30 can be the same (150 Mb/s). In addition, at this time, there are always two or more connections between ring and ring and so even if one node is down because of a power failure or the like, service information which only passes through that the node can set passage through a difference connection node.

In a case when the node "d" on the ring 12 is down for example, when there is an input via the node "a" of the ring 12, to the node "b" of a P-AIS indicating that the node "d" is down, the node "b" does not use the ring 12 to send service information to the node "c", but instead uses the switch PPS 13 to switch to the ring 30 and sends the service information to the node "c" via a the ring 30.

Figure 11:
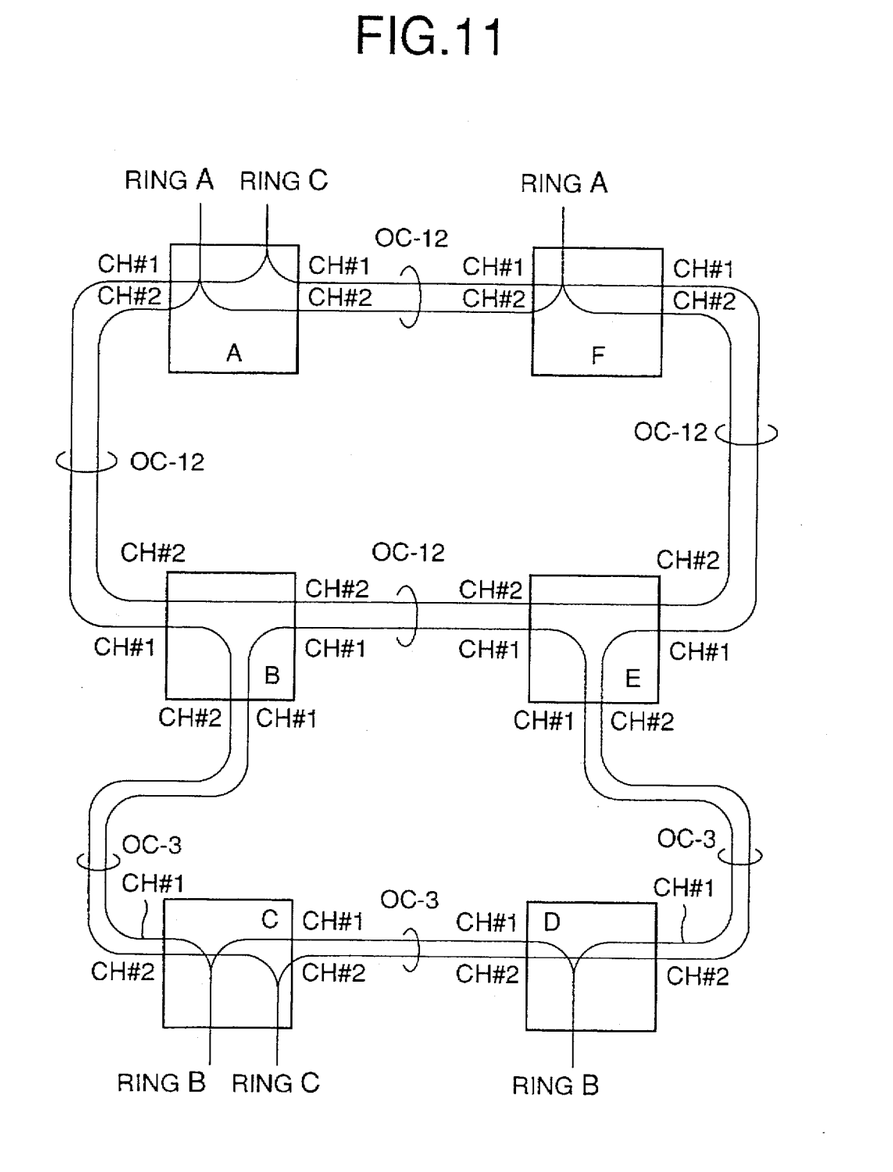
FIG. 11 is a view showing an example of settings for cross-connection of an embodiment according to the present invention.

FIG. 11 shows an example of a setting for cross-connection in an embodiment of the present invention. In the example shown in the figure, the configuration has the two rings OC-12 and OC-3 and three virtual rings A, B and C configured inside these two rings.

The ring A is a ring which connects the node "a" and the node "f", routes of connection being path a-f and path a-b-e-f. Ring A is enclosed within the ring OC-12.

The node "b" is a ring which connects the node "c" and the node "d", routes of connection being path c-b-e-d and path c-d, with the ring B being configured by the OC-12 only between the node "b" and the node "e", and being configured by the OC-3 ring for other sectors.

The ring C is a ring which connects the node "a" and the node "c", route of connection being set as nodes a-f-e-d-c. This ring is set so as to form two rings without disconnecting the SONET path, and can be said to best exhibit the features of a virtual ring.

In addition, assuming that the ring B is recovered from the diagram, then the node "e" becomes the ADD/DROP from the right side, while the node "b" becomes the ADD/DROP from only the left side.

In addition, as shown in FIG. 7, by having the same interface for both the tributary-side interface and the line-side interface, it becomes possible to directly connect the tributary-side of a network element of one node, to the line-side of a different node, thus enabling the number of network elements of the contact points between rings to be reduced. In addition, as a result of this, it becomes possible to connect rings internal to the apparatus.

In the ring configuration shown in FIG. 1, this enables both the interface on the tributary-side to have the same interface as the line-side. With an FLM 150 ADM it is possible to have the same OC-3 (150 Mb/s optical) interface 3 on the line-side and the tributary-side, and for signals after cross-connection by VT or STS1 to be multiplexed for up to STS-3 and sent by the OC-3. In this case, the OC-3 signals of the tributary-side interface are not necessarily all used but the speed of the line layer has no relationship to the PPS. The PPS ring sees only the path-layer signals so that it is possible to have a setting for protection switches or the like. In addition, this PPS ring is configured by several path-layer signals gathered together, and as described above, a PPS ring basically refers only to the path-layer and so the speed of the line layer is irrelevant.

As has been described above, according to the first invention, the use of an apparatus using the PPS for all of nodes inside the ring enables receive terminal switching having P-AIS as the trigger. When this is done, as lone as a SONET path is passed through, the use of P-AIS a enables switching operation by monitoring P-AIS even if each node does not identify the route through which the received signal has passed. Accordingly, the present invention enables the disconnection of service to be prevented in cases when an obstruction has occurred in a transmission path or a node.

Furthermore, with the present invention, even if there is a configuration where an asynchronous circuit is inserted in the network, conversion (or conversion back) from a P-AIS to an asynchronous AIS between that synchronous network and an asynchronous network enables mutual receiving and sending of a switching trigger, and enables path switching without the asynchronous circuit inserted into the configuration having any relationship.

In addition, by performing the ADD/DROP specification from the line-side only, for examples, in the setting of the cross-connection internal to the apparatus, it is possible to have a virtual configuration for two rings. By extending this, it is possible to simply connect multiple rings. In addition, there are always two or more connection points between a ring and an other ring and so in a worst case, if a node of a single connection point is down due a power failure or the like, only the service information passing through that node enables the node of a separate connection point to be passed. Through this, it is possible to have recovery without disconnection of the service information.

In addition, by having the interface on the tributary-side the same as the interface on the line-side, it is possible to have direct connection from the tributary-side of a network element of a node to the line-side of a difference node. Accordingly, it is possible to reduce the number of network elements at the point of connection between rings. In addition, as a result of this, a ring can be connected internal to the apparatus and enable connection without the SONET path being terminated between rings.

Furthermore, with this method, it is possible to have the simple connection of rings having different communication speeds between network elements which can have the path switched by a path-layer, irrespective of the line layer speed.

As has been described above, according to the present invention, a configuration of a virtual ring network using PPS transfer apparatus facilitates a network with multiple rings and also, in cases when there is circuit (ring) expansion, facilitates this if there is an empty capacity in the main network.

It will be apparent to those skilled in the art that further modifications and variations can be made in the present invention. The invention in its broader aspects, therefore, is not limited to the specific details and illustrative examples shown and described. Accordingly, departure may be made from such details without departing from the spirit or scope of the general inventive concept.

What is claimed is:

1. A virtual ring configuration method for an optical communication network having a plurality of rings each including a plurality of nodes, the method comprising the steps of:

cross-connecting said rings having a plurality of nodes and performing transfer of service information by a SONET (synchronous optical system) path between said nodes;

producing a path alarm signal in response to the generation of an abnormality in said path;

cross-connecting said information from one of said rings to another ring in response to said path alarm signal;

judging whether or not said path alarm signal has been produced;

converting a synchronous signal received at a line side interface of said nodes into an asynchronous signal at a tributary side interface of said nodes in response to both said line side interface receiving said path alarm signal and an asynchronous circuit being linked to a transfer destination node; and converting an asynchronous signal received at said line side interface into a synchronous signal at said tributary side interface in response to both said line side interface receiving said path alarm signal and a synchronous circuit being linked to said transfer destination node.

2. The virtual ring configuration method as claimed in claim 1, which further includes judging that an obstruction has occurred in a previous stage, if service information received via said SONET path which was received from a previous stage node includes said path alarm signal (P-AIS).

3. The virtual ring configuration method as claimed in claim 1, wherein said cross-connecting information step is performed by said tributary side interface within a node.

4. The virtual ring configuration method as claimed in claim 3, wherein said tributary-side interface within a node is the same as the line-side interface, with signals input from the line-side being processed by said tributary-side, and sent to other nodes.

5. The virtual ring configuration method as claimed in claim 4, which further includes converting said path alarm signal which is produced in response to an abnormality to said ring received at said line-side interface as an asynchronous signal and sent to another node on said ring when said information is to be sent next to said asynchronous circuit.

6. The virtual ring method as claimed in claim 1, which further includes:

transferring said synchronous signal from said line side interface to said tributary side interface when said line side interface receives said path alarm signal and said synchronous circuit is linked to said transfer destination node; and transferring said asynchronous signal from said line side interface to said tributary side interface when said side line interface receives said path alarm signal and said asynchronous circuit is linked to said transfer destination node.

7. A virtual ring system, comprising:

a plurality of rings, wherein each of said rings includes a plurality of nodes interconnected by a SONET (synchronous optical network) system for sending and receiving service information between said nodes;

means for cross-connecting between said rings enabling said service information to be switched between said rings;

means for sending and receiving information by said SONET system using optical communication between said nodes;

obstruction information judgment means for judging whether or not obstruction information has been received by said sending and receiving means via said SONET system;

path protecting switching means for switching a receive terminal in cases where said obstruction information judgment means judges that obstruction information has been received; and wherein said path protection means further provides selecting means for selecting arbitrarily a ring, when a plurality of rings are cross-connected in said node.

8. The virtual ring system as claimed in claim 7, wherein said obstruction information judgment means judges that an obstruction has occurred in a previous stage node on said ring when a path alarm indication signal is received from said previous state node via said SONET system.

9. The virtual ring system as claimed in claim 8, wherein each of said plurality of nodes has said obstruction information judgment means and said path protection switching means on the said tributary-side.

10. The virtual ring system as claimed in claim 9, wherein said tributary-side inside each of said plurality of nodes include a transfer means which is provided with an interface the same as the line-side, and processes inputs received via said SONET system from said line-side, and transfers to the line-side of another node.

11. The virtual ring system as claimed in claim 10 wherein said transfer means of said tributary-side within each of said plurality of nodes convert a synchronous path alarm indication signal input from said line-side, into an asynchronous signal in cases when a ring between a self-node and a node to which data is to be next sent is an asynchronous circuit.

12. The virtual ring system as claimed in claim 10 wherein said transfer mean of said tributary-side within said node converts an asynchronous path alarm indication signal input from said line-side, into an synchronous signal in cases when a ring between a self-node to which data is to be next sent is a synchronous circuit.

\* \* \* \* \*